Oct. 13, 1970 C. S. TURBEVILLE ET AL 3,533,182

FISH LURE

Filed July 10, 1968

INVENTORS
CLARENCE S. TURBEVILLE
IKE J. WALKER

Richards, Harris & Hubbard
ATTORNEY

United States Patent Office 3,533,182
Patented Oct. 13, 1970

3,533,182
FISH LURE
Clarence S. Turbeville and Ike J. Walker, Gainesville, Tex., assignors to Bomber Belt Company, Gainesville, Tex., a corporation of Texas
Filed July 10, 1968, Ser. No. 743,757
Int. Cl. A01k 85/00
U.S. Cl. 43—42.14      4 Claims

ABSTRACT OF THE DISCLOSURE

A fish lure comprising an elongated body having rotatably mounted spinners with vanes of opposite pitch on the nose and tail of the body, respectively, which cause the lure to zigzag as it is pulled through the water. A first race is positioned between the said nose and the forward spinner and a second race is positioned rearwardly of the rear spinner.

---

This invention relates to fish lures.

Various fish lures have been developed with hydrodynamic features which cause the lure to move through the water with motions calculated to attract game fish.

An object of this invention is to provide a novel fish lure.

Another object of this invention is to provide a novel fish lure, particularly adapted as a top water lure, which will move in a zigzag motion as it is pulled across the water.

According to the invention, a novel fish lure is provided having a generally elongated torpedo body with rotatably mounted spinners on the head and tail thereof which have oppositely pitched vanes to thereby cause the spinners on the head and tail to move in opposite directions as the lure is moved through the water. These oppositely rotating spinners generally impart a zigzag motion to the lure as it is pulled through the water.

This invention can be more easily understood from a study of the drawings in which.

Figure 1:
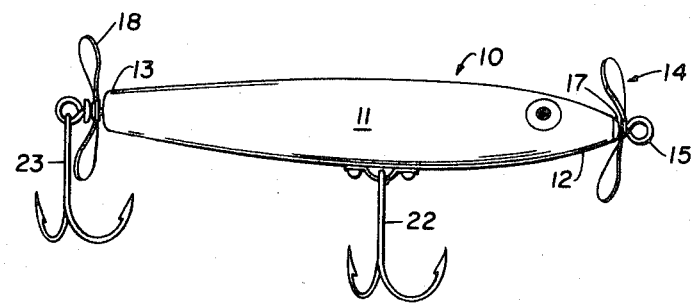
FIG. 1 is an elevation view of a preferred embodiment of this invention.
Figure 2:
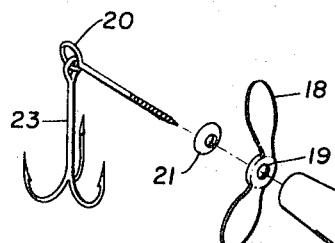
FIG. 2 is an exploded view in perspective showing the lure of FIG. 1.

Now referring to FIGS. 1 and 2, the body of lure 10 generally comprises an elongated torpedo-shaped body 11 having substantially frusto-conically shaped nose and tail sections 12 and 13, respectively. It is generally preferred that body 11 be made from wood or a foamed plastic material or the like having a density less than water. Nose spinner 14 comprises two vanes spaced 180° apart, which are bent slightly inward toward the nose section 12. The vanes can be pitched with either a right- or left-hand twist, but are shown with a right-hand twist in the drawings. This will allow the spinner 14 to move in a clockwise direction (as seen by facing FIGS. 1 or 2) as the lure is pulled through the water. Spinner 14 rotates on an axle formed by the smooth longitudinal portion of eye screw 15 which is screwed into the center of nose section 12. The inside center portion of spinner 14 around aperture 16 is concave, and thereby rides on convex race 17 as the spinner rotates. Thus, when assembled, eye screw 15 retains race 17 and spinner 14 on nose portion 12; provides a spindle for spinner 14; and the eye portion thereof is attached to a fishing line.

Figure 3:
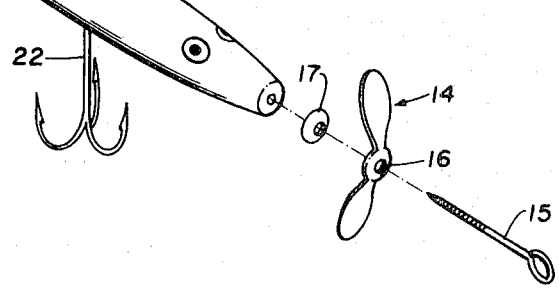
FIG. 3 is a partially exploded view illustrating a detail of FIG. 1.
Figure 3:
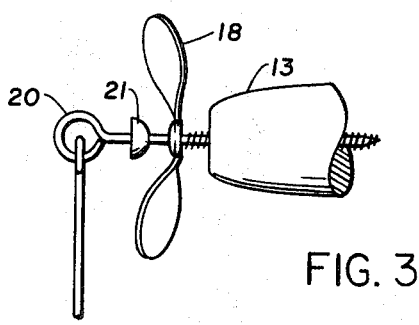

Rear spinner 18 comprises two vanes spaced 180° apart and bent slightly away from tail section 13. The pitch of the vanes of spinner 18 are opposite to the pitch of the vanes of spinner 14, and in this instance correspond to a left-hand twist. Aperture 19 passes through the axis of spinner 18 and is adapted to receive eye screw 20. As illustrated in FIGS. 1–3, the center outer portion of spinner 18 around aperture 19 is convex, and runs on opposed convex race 21 as spinner 18 rotates about the smooth axle portion of eye screw 20.

Neither the number nor the relative positioning of the hooks on lure 10 are intended to limit the scope of this invention; however, it is generally preferred that a treble hook 22 be pivotally attached substantially under the thicker portion of body 11 as illustrated in the drawings, and that treble hook 23 be pivotally mounted in the eye portion of eye screw 20 on the tail of the lure. It is noted that spinners 14 and 18 can have 2, 3, 4 or more vanes, but generally two vanes are preferred. Also, while spinners 14 and 18 can be made of any tough durable material such as steel, it is preferred that they be highly polished metal or a suitable substrate coated with a shiny silver material such as chrome which will readily reflect light.

In operation, after the lure has been cast into the water and is being reeled in, the action of the water passing by the vanes on spinner 14 will cause it to turn in the clockwise direction (as previously described), and the action of the water passing by the vanes of spinner 18 wil cause it to turn in the counterclockwise direction. This action will impart a zigzag motion to the lure which makes it highly attractive to game fish. Additionally, light reflected by the movement of the shiny spinners through the water will attract game fish. The lure can be painted any conventional color with or without sparkle material added thereto, or ribs painted thereon. Generally, it is preferred that the lure be at least partially painted with a lighter color such as yellow or white.

Although this invention has been described with respect to its preferred embodiments, it should be understood that many variations and modifications will now be apparent to those skilled in the art, and the above described preferred embodiments are not intended to limit the scope of this invention.

What is claimed is:
1. A top water fishing lure comprising:
   (a) an elongated torpedo shaped body having generally frusto-conically shaped nose and tail sections and at least one fishhook pivotally attached thereto;
   (b) a first spinner rotatably mounted on the end of said nose section and having at least two curved vanes of a pitch which causes said spinner to rotate in a first direction as said lure passes through the water, the inside axis portion of said first spinner being concave and resting on a convex race extending from the end of said nose section; and
   (c) a second spinner rotatably mounted on the end of said tail section having at least two curved vanes of opposite pitch than the vanes of said first spinner to thereby cause said second spinner to rotate in a direction opposite of said first direction as said lure moves through the water, the outside axis portion of said second spinner being convex and resting against an opposed convex race positioned outwardly of said second spinner.

2. The lure of claim 1 wherein said first and second spinners are retained on first and second axles respectively extending from the nose and tail sections of said body and through apertures through the axis of each spinner.

3. The lure of claim 2 wherein the outer end of said first axle comprises an eye for attaching a fish line thereto.

4. The lure of claim 3 wherein the outer end of said second axle has a fishhook means pivotally attached thereto.

References Cited

UNITED STATES PATENTS

| | | | |
|---|---|---|---|
| 831,831 | 9/1906 | Clippinger | 43—42.14 X |
| 843,256 | 2/1907 | Bowersox | 43—42.14 |
| 923,095 | 5/1909 | Wilcox | 43—42.14 |
| 1,920,935 | 8/1933 | Khoenle | 43—42.14 X |
| 810,017 | 1/1906 | Ackerman | 43—41.14 X |
| 3,112,576 | 12/1963 | Tay | 43—42.14 |
| 3,344,550 | 10/1967 | Peters | 43—42.14 |

SAMUEL KOREN, Primary Examiner

D. J. LEACH, Assistant Examiner

U.S. Cl. X.R.

43—42.17

UNITED STATES PATENT OFFICE
CERTIFICATE OF CORRECTION

Patent No. 3,533,182                         October 13, 1970

Clarence S. Turbeville et al.

It is certified that error appears in the above identified patent and that said Letters Patent are hereby corrected as shown below:

In the heading to the printed specification, line 4, "assignors to Bomber Belt Company" should read -- assignors to Bomber Bait Company --.

Signed and sealed this 30th day of March 1971.

(SEAL)
Attest:

EDWARD M. FLETCHER, JR.
Attesting Officer

WILLIAM E. SCHUYLER, JR
Commissioner of Patents